(12) United States Patent
Gao

(10) Patent No.: US 9,665,479 B2
(45) Date of Patent: May 30, 2017

(54) MANAGING RESPONSE TIME

(71) Applicant: Seagate Technology LLC, Cupertino, CA (US)

(72) Inventor: Wuzi Gao, Savage, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 267 days.

(21) Appl. No.: 14/178,105

(22) Filed: Feb. 11, 2014

(65) Prior Publication Data
US 2015/0227457 A1 Aug. 13, 2015

(51) Int. Cl.
| G06F 12/00 | (2006.01) |
| G06F 12/02 | (2006.01) |
| G06F 11/16 | (2006.01) |
| G06F 3/06 | (2006.01) |
| G06F 11/10 | (2006.01) |

(52) U.S. Cl.
CPC ........ *G06F 12/0246* (2013.01); *G06F 3/0679* (2013.01); *G06F 3/0689* (2013.01); *G06F 11/1076* (2013.01); *G06F 11/1662* (2013.01); *G06F 2212/1032* (2013.01); *G06F 2212/7208* (2013.01)

(58) Field of Classification Search
CPC .. G06F 12/0246; G06F 3/0679; G06F 3/0689; G06F 11/1076; G06F 11/1662
USPC .......................................................... 711/103
See application file for complete search history.

(56) References Cited

U.S. PATENT DOCUMENTS

| 7,574,623 | B1 * | 8/2009 | Goel | G06F 11/1088 |
| | | | | 714/47.2 |
| 7,830,708 | B1 | 11/2010 | Jung et al. | |
| 8,050,092 | B2 | 11/2011 | Jung et al. | |
| 2010/0125751 | A1 | 5/2010 | McKean | |
| 2012/0066449 | A1 | 3/2012 | Colgrove et al. | |
| 2014/0337667 | A1 * | 11/2014 | Postage | G06F 11/1412 |
| | | | | 714/15 |
| 2015/0032939 | A1 * | 1/2015 | Gao | G06F 12/0253 |
| | | | | 711/103 |

* cited by examiner

*Primary Examiner* — Prasith Thammavong
(74) *Attorney, Agent, or Firm* — Holzer Patel Drennan

(57) ABSTRACT

Implementations disclosed herein provide for a method comprising receiving a read request to read data from a target die of a storage device, and rebuilding the data stored on the target die using data stored on other dies of the storage device, if a current operation to the target die of the storage device prevents the servicing of the read request until completion of the current operation.

23 Claims, 5 Drawing Sheets

MANAGING RESPONSE TIME

BACKGROUND

Data storage devices operate to store and retrieve user data in a fast and effective manner. Response time is critical for data storage system performance. Some data storage devices utilize memory elements (e.g., dies or blocks) to store user data, such as in the case of a solid-state drive (SSD). For example, SSD can store data in a number of memory elements with each memory element having a large number of data blocks. The memory elements can take a variety of configurations, including, but not limited to, dynamic random access memory (DRAM), static random access memory (SRAM), Flash, electrically erasable programmable read only memory (EEPROM), spin-torque transfer random access memory (STRAM), and resistive random access memory (RRAM).

The dies can be arranged into an array of rows and columns, with each column of dies being accessed by one of a number of buses. Each die may include a number of blocks, with each block including a number of pages of data. In some implementation, the dies in each column may be connected in a NAND configuration, such as in the case of certain types of Flash memory arrays.

SUMMARY

Implementations disclosed herein provide a method comprising receiving a read request to read data from a target die of a storage device and rebuilding the data stored on the target die using data stored on other dies of the storage device, if a current operation to the target die of the storage device prevents the servicing of the read request until completion of the current operation.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following more particular written Detailed Description of various implementations and implementations as further illustrated in the accompanying drawings and defined in the appended claims.

BRIEF DESCRIPTIONS OF THE DRAWINGS

Figure 1:
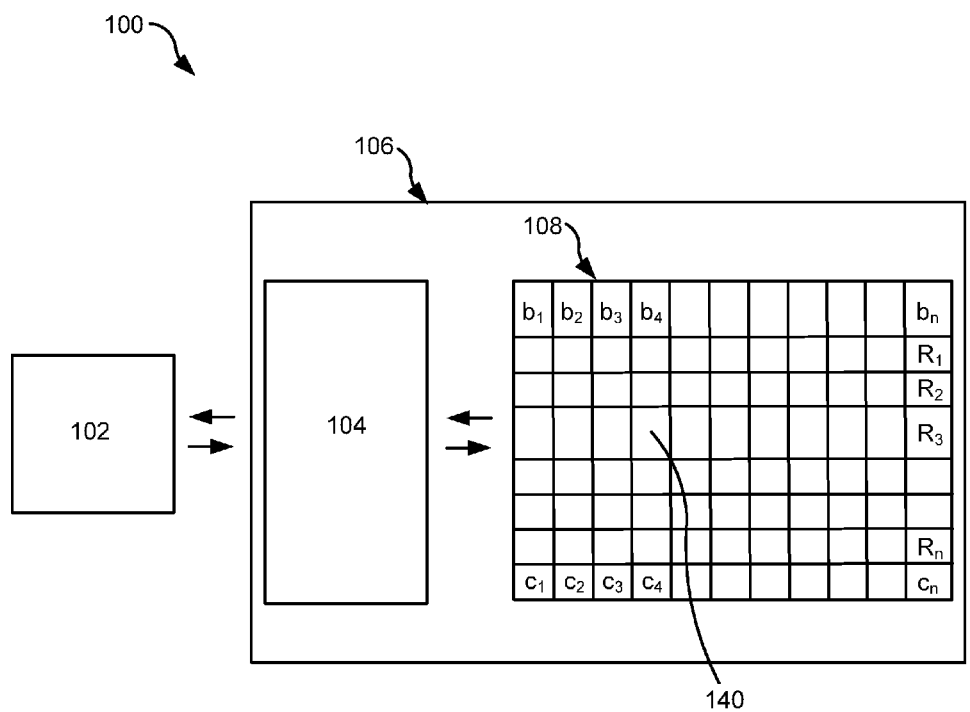

FIG. 1 provides a diagram of an example data storage system.

Figure 2:
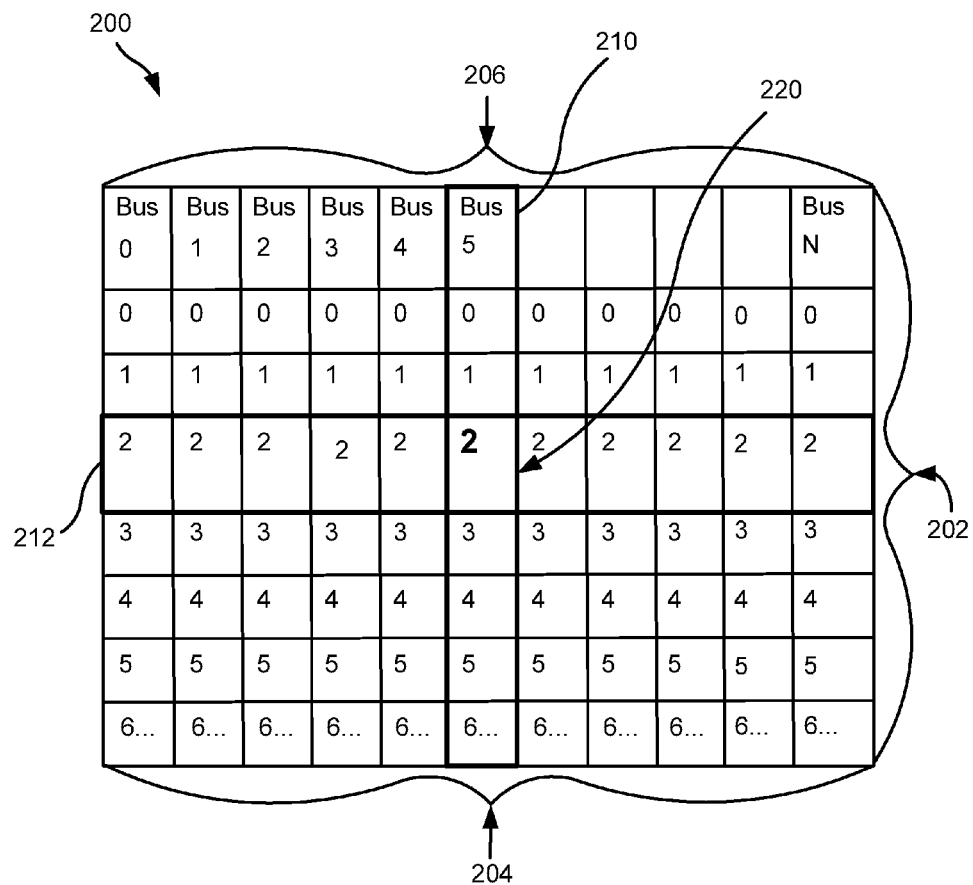

FIG. 2 illustrates an example array of memory dies.

Figure 3:
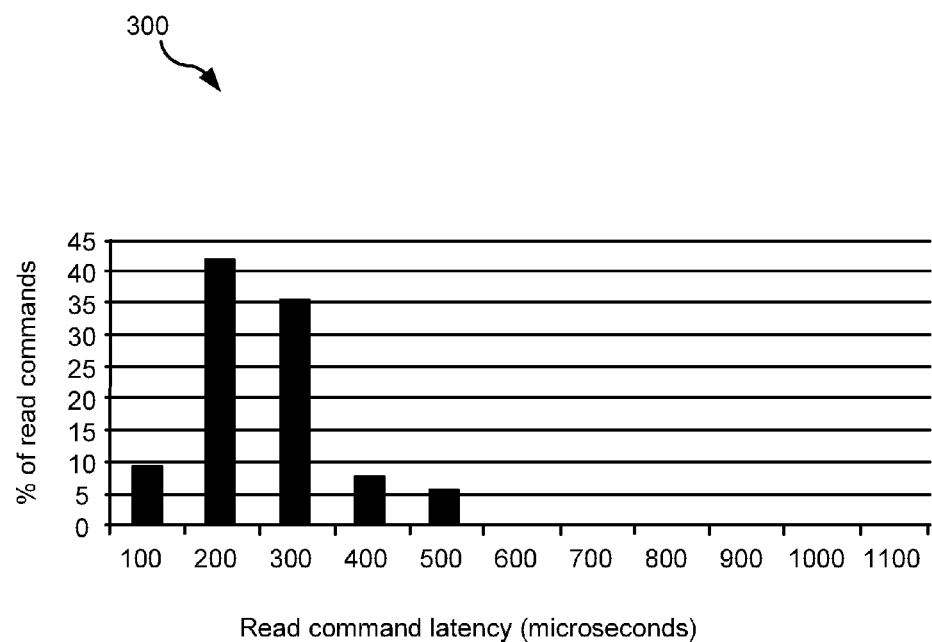

FIG. 3 graphically represents an example latency time distribution.

Figure 4:
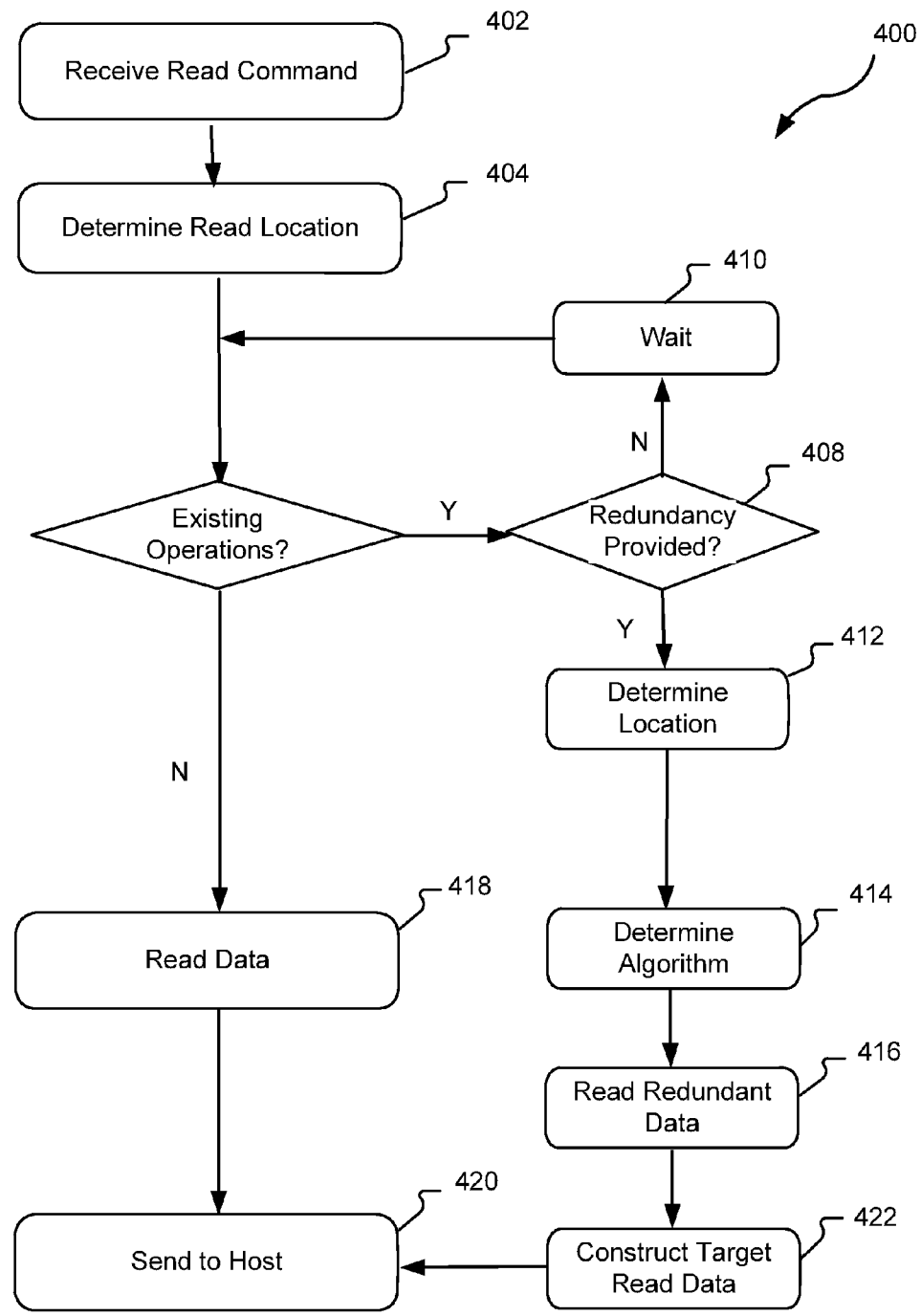

FIG. 4 provides a flowchart of example operations 400 managing read response time.

Figure 5:
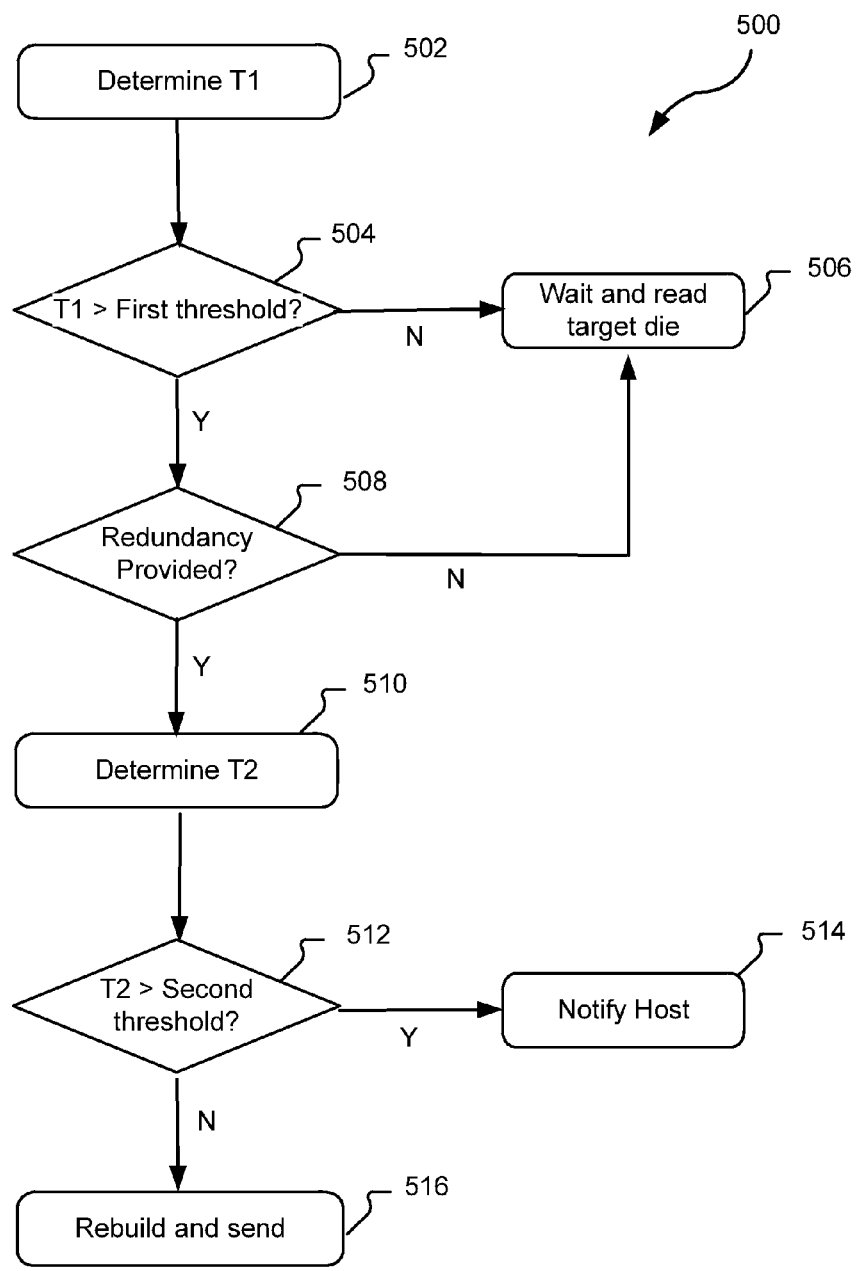

FIG. 5 provides a flowchart of example operations 500 for determining when to notify a host to use other sources to service data.

DETAILED DESCRIPTION

Implementations of the technology disclosed herein may be employed in the context of a data storage system, although other application may also be contemplated.

Host devices such as computers, mobile devices, etc., include storage devices that receive requests for various data operations from the host device. Examples of such devices include disc drives, Flash storage devices, etc. The storage devices include storage controllers that process the data operation requests from the host devices and perform the requested operations. For example, a Flash storage device, such as a NAND Flash storage device, may include a Flash controller that receives a data read request, a data erase request, an NAND program request, etc., from the host device. The request from the host device may also include an address where the data operation is to be performed. For example, a host device may provide a data read request with a logical block address (LBA) of the data to be read. The storage device controller converts the LBA address to the physical address on the storage device.

In the example of a NAND Flash storage device, the storage area is configured in the form of an array with a number of columns and rows of dies, with each die including a large number of blocks of data. In this case, upon receiving the data operation request from the host device specifying an LBA, the storage device controller converts the LBA to a physical address that may specify the specific die. However, as a typical die stores a large amount of data, it is possible that there may be a number of other operations being performed on that die. For example, in storage device that divides the storage space into sixty-four (64) dies, depending on the workload on the storage device, the likelihood of a request to go to a die that is target of other operations, such as a program operation or an erase operation is not small.

In certain circumstances, the response time for reading data from an array may be delayed if a specific target die upon which a read request is made is undergoing a current operation. Specifically, a NAND Flash is limited in that once a die has an ongoing operation, the die cannot concurrently accommodate additional operation. For example, if a NAND flash erase operation is initiated on a target die, a read request transferred by a controller to that die must wait, possibly up to as much as ten milliseconds to start the read. If a program operation is taking place on a target die, the response time may take up to three milliseconds. Thus, there is a long response time for any read operations to be carried out.

In one implementation of a NAND Flash disclosed herein, a controller attempting to service a read request from a host to an array of dies may recognize operational activity at a target die, at which there is die level redundancy. For example, the controller determines that location of a target die to service the read request based on the LBA of the read request. Subsequently, the controller determines other operations that are being serviced from the target die or by the bus that accesses the target die. Upon identification of activity on the target die or the activity on the other dies being accessed by the same bus that accesses the target die, the controller determines that the read request cannot be immediately serviced. The controller may also determine an estimated response time for any read operation to be carried out on that target die.

After determining the response time, the controller may compare the estimated response time to a threshold and if the response time is below a threshold, it may determine to simply wait until the other current operations are complete before accessing the target die to service the read request. However, if the estimated response time is above the threshold, the controller may determine if there are any redundancies provided for the data stored on the target die and the type of redundancy. For example, RAID configurations may use striping, mirroring, or parity techniques to create large reliable data stores.

Once the locations where the redundant data is stored in determined, the controller transfers the read request from a host to an array of other dies where the redundant data is stored. The controller may recognize areas of mirror redundancy, for example, in other dies on the same bus or channel that are not tied up by other current operations as well as other dies served by other buses or channels. The controller may then determine where to transfer the read request and initiate a rebuild of that data from such other dies. Such a rebuild operation reduces the read response time. Alternatively, if there is no redundancy provided and/or when the estimated time to service the request by rebuilding data using redundancy is high, notifies the host. In such case, the host may initiate alternative actions to execute the read request through other sources.

FIG. 1 illustrates an example system 100. The system 100 includes a host device 102 and a data storage device 106 communicating with each other. For example, the host device 102 may be a computer, a mobile device, etc. The data storage device 106 may be a hard disc drive (HDD), a solid-state drive (SSD) such as a Flash drive, etc. In one implementation, the data storage device 106 is a sold-state drive (SSD) that utilizes NAND Flash memory. The data storage device 106 includes a controller 104 that communicates with the host device 102 and memory 108.

In the example implementation, the memory 108 is arranged in a number of dies arranged in rows $r_1$ to $r_n$ and columns $c_1$ to $c_n$. Each die may store a number of data blocks, wherein each block includes a number of data pages. A number of buses $b_1$ to $b_n$ may be used to access data from the dies located in particular columns. For example, each of the dies located in row $r_1$ can be accessed using the bus $b_1$, each of the dies located in row $r_2$ can be accessed using the bus $b_2$, etc.

The host 102 may send various commands to a controller 104 located in a data storage device 106. For example, the host 102 may send a read request to the controller 104 specifying the logical block address (LBA) of the read request. The controller converts the LBA of the read request to the physical address on the memory 108 where the target data for the read request is located. For example, the controller 104 may determine the die number, the block number, the page number etc., of the target data. The controller 104 then sends read commands to a die (e.g., die 140) located on the memory 108. In this example, the die 140 is located in row $r_3$ and column $c_4$. Therefore, data can be read from the die 140 using the bus $b_4$ and sent back to the controller 104. Subsequently, the controller 104 transfers data to the host 102.

In one implementation of the system 100, the memory 108 is configured to store data on the various dies such that redundancy for the data stored on a given die can be stored on other dies of the memory 108. For example, the redundancy for the data stored on die 104 may be stored in other dies of the row that includes the die 140. Thus, in the illustrated implementation, the other dies on the row $r_3$ may store redundancy for the data stored on die 140. Alternatively, the redundancy for the data stored on a given die may also be stored on dies of other rows as long as buses other than the bus accessing the given die can access the other dies storing the redundancy. As an example, the redundancy data can be stored on any other dies of the memory 108 that can be accessed by buses other than bus $b_4$.

Upon determining that the read request is for data from die 140, the controller 104 determines if there are any other operations that are active for die 140. For example, the die 140 may be target of an active erase operation, an active program operation, etc. Alternatively, the controller 104 determines all active operations for all dies that are serviced by the bus that serves die 140, namely bus $b_4$. The controller 104 determines the amount of estimated time that it will take to finish such active operations. Furthermore, the controller 104 may also compare such estimated time with a threshold to determine subsequent set of actions. For example, if the estimated time is below a first threshold, the controller 104 may simply decide to wait until the active operations are serviced.

If the estimated time is above the first threshold, the controller 104 determines whether any redundancy is provided for the data in die 140. If such a redundancy is provided, the controller determines which other dies store the redundancy data. The controller also determines the algorithm to rebuild the data. After determining the dies storing the redundancy and the algorithm, the controller 104 determines the amount of time it will take to rebuild the data. If the amount of time necessary to rebuild is higher than a second threshold, the controller 104 may notify the host 102 that it will take a long time to get the data back, in which case, the host 102 may take action to get the data from other sources.

If the amount of time necessary to rebuild is lower than the second threshold, the controller 104 accesses the other dies that store the redundancy, read the redundancy data from these dies, and use the redundancy algorithm to reconstruct the data for die 140. For example, the controller 104 may access data from the dies in one or more of the columns $c_1$, $c_2$, $c_3$, $c_5$, ... $c_n$ to reconstruct the data from the die 140. Subsequently the controller 104 sends the reconstructed data to the host 102.

FIG. 2 illustrates an example array of memory 200 that is arranged in a plurality of dies. As depicted, the memory 200 can be arranged into an array of rows 202 and columns 204, wherein each of the columns is accessed by of a plurality of buses 206. The die in each column may be connected in a NAND configuration, such as in the case of certain types of Flash memory arrays. Typically, a read operation can be carried out to read the contents of the memory die along a selected column, such a column 210. Because each column is accessed by a separate bus, the entire contents of the selected row can be retrieved from the array at the same time using all the buses. For example, each die of the row 212 can be accessed simultaneously using the buses 206.

In one implementation, a controller managing the memory 200 may recognize activity at the die 220, which is located in column 210 and row 212. For example, the die 220 may be accesses for an erase operation, a program operation, etc. After determining that die 220, which is accessed by Bus 5 is occupied with an operation, the controller can determine if there is any redundancy provided for the data in die 220 and if so the controller determines the other dies that store such redundancy data. The controller, aware of all activity in various locations within the specific memory 200, initiates a rebuild operation to rebuild the data from die 220. For example, the controller can determine that data on dies that can be accessed using buses 0, 1, 3, 4, 5, or 6 includes redundancy data for the data on die 220. In this case, the controller initiates read operations on these buses to read the redundancy data. Once the redundancy data is read, the controller uses the redundancy algorithm to rebuild the data. Such rebuilding of data using redundant data on other dies facilitates management of the response time for the memory 200.

FIG. 3 illustrates a graph 300 of example latency time distribution resulting from an implementation of the system disclosed herein for rebuilding read data using redundancy. As depicted in the graph, latency time is shown in microseconds per percentage of read commands. In some implementations, response latency can be reduced below 500 microseconds using the method disclosed herein for rebuilding data using redundancy. Such results are significant, especially in a SSD drive that uses NAND, to provide consistent response time where the SSD depends on parallel operations of multiple dies.

Referring now to FIG. 4, example operations 400 of a method for managing response time are shown. A receive read command operation 402 receives a read command from a host at a controller. The controller then determines a target read location in a determining read location operation 404. For example, the operation 404 determines the target read location in a memory using the LBA of the read request. The information about the target read location may include the information about a target die that stores the data.

Subsequently, at a determining existing operation 406, the controller may determine if there are any existing operations or activities at the target read location or the target die that may prevent or delay serving the read request. If there are no such delaying or preventing operations taking place on the specific target die, a read data operation 418 reads the data from the target die. After the data is read, the data may be sent to the host in a send to host operation 420, and management of the read response is complete.

However, if the determining operation 406 determines that there are operations taking place on a specific die in the determining existing operations 406, another operation 408 determines if redundancy is provided for the data stored on the target die. If no such redundancy is provided, after a waiting operation 410, the determining operation 406 is repeated. If the operation 408 determines that redundancy is provided for the data on the target die, an operation 412 determines the location of the dies that store the redundant data.

An operation 414 determines an algorithm that is used to rebuild the data. The redundant data is read from other dies in a read redundant data operation 416. The target read data is constructed in a construct target read data operation 422 and sent to the host in an operation 420. Thus, management of the read response is performed via other dies in the same bus as a specific target die.

FIG. 5 illustrates operations 500 for determining when to notify a host to use other sources to service data. A determining operation 502 determines the estimated time T1 for completing current operation at a target die. Another determining operation 504 compares T1 to a first threshold. If T1 is lower than the first threshold, after a waiting operation 506, the data from the target die is read.

If T1 is larger than the first threshold, a determining operation 508 determines if redundancy is provided for the data on the target die. If such redundancy is provided, a determining operation 510 determines the time T2 to rebuild the data using the redundancy. Subsequently, another operation 512 compares T2 to a second threshold. If T2 is higher than the second threshold, a notifying operation 514 notifies a host to get the data from other sources. If T2 is equal to or lower than the second threshold, a rebuilding operation 516 rebuilds the target data using the redundancy and sends the data to the host.

The above specification, examples, and data provide a complete description of the structure and use of example implementations of the invention. Since many implementations of the invention can be made without departing from the spirit and scope of the invention, the invention resides in the claims hereinafter appended. Furthermore, structural features of the different implementations may be combined in yet another implementation without departing from the recited claims. The implementations described above and other implementations are within the scope of the following claims.

What is claimed is:

1. A method, comprising:
    receiving a read request to read data from a target die of a storage device;
    determining an estimated time to complete a current operation to the target die of the storage device if the current operation to the target die of the storage device prevents the servicing of the read request; and
    rebuilding the requested data from other sources if the estimated time to complete the current operation is above a first threshold.

2. The method of claim 1, wherein the storage device is a solid-state drive device.

3. The method of claim 1, wherein the current operation is a program operation.

4. The method of claim 1, wherein the current operation is an erase operation.

5. The method of claim 1, wherein a controller is further configured to determine that the current operation will delay servicing the read request.

6. The method of claim 5, further comprising determining the target die based on an LBA provided by the read request.

7. The method of claim 1, further comprising wherein the rebuilding the requested data uses other dies on a same strip of a memory array as the target die, each of the other dies can be accessed while servicing the current operation.

8. The method of claim 1, further comprising wherein the rebuilding the requested data stored on the target die further comprises rebuilding the data using mirror redundancy.

9. The method of claim 1, further comprising notifying the host to wait until the current operation is completed if the estimated time to complete the current operation is below a first threshold.

10. The method of claim 9, further comprising determining whether any redundancy is provided for the requested data in the target die if the estimated time to complete the current operation is above the first threshold.

11. The method of claim 10, further comprising determining which other dies store the redundancy data.

12. The method of claim 11, further comprising determining the amount of time it will take to rebuild the requested data on the other dies.

13. The method of claim 12, further comprising determining to rebuild the requested data from other sources, if the amount of time it will take to rebuild the requested data from other sources is higher than a second threshold.

14. The method of claim 12, further comprising reading the redundancy data from the other dies that store the redundancy to reconstruct the requested data for the target die, if the amount of time it will take to rebuild the requested data from other sources is lower than a second threshold.

15. An apparatus, comprising:
    a host configured to send a read request to a storage device; and
    the storage device configured to store data, the storage device comprising:
        a memory array comprising a plurality of dies arranged into rows and columns; and
        a controller configured to interpret the read request to determine a target die, wherein the controller is configured to determine an estimated time to complete a current operation to the target die of the storage device if the current operation to the target die of the storage device prevents the servicing of the read request, and rebuild data stored on the target die using data stored on the other of the plurality of dies if the estimated time to complete the current operation is above a first threshold.

16. The apparatus of claim 15, wherein the controller is configured to rebuild the data stored on the target die using the data stored on other dies on different columns.

17. The apparatus of claim 15, wherein the plurality of dies is connected in a NAND configuration.

18. The apparatus of claim 15, wherein the current operation is at least one of a program operation and an erase operation.

19. The apparatus of claim 15, wherein the storage device is a solid-state drive device.

20. The apparatus of claim 15, wherein the storage device is a hard disc drive.

21. An apparatus, comprising:
a storage device configured to store data in a plurality of dies, wherein redundancy for the data stored in one of the plurality of dies is provided on the other of the plurality of dies; and a controller configured to:

receive a request for the data stored on the one of the plurality of dies;

determine an estimated time to complete a current operation to the target die of the storage device if the current operation to the target die of the storage device prevents the servicing of the read request; and rebuild the requested data stored on the one of the plurality of dies using the redundancy provided on the other of the plurality of dies, if a current operation to the one of the plurality of dies of the storage device prevents the servicing of the request until completion of the current operation and if the estimated time to complete the current operation is above a first threshold.

22. The apparatus of claim 21, wherein the storage device is a solid state drive.

23. The apparatus of claim 21, wherein the storage device is a NAND Flash drive.

* * * * *